United States Patent
Almonacil et al.

(10) Patent No.: US 9,346,320 B2
(45) Date of Patent: May 24, 2016

(54) TYRE WITH SPECIFIED BELT STRUCTURE

(75) Inventors: Cèline Almonacil, Milan (IT); Stefano Bizzi, Cinisello Balsamo (IT); Maurizio Boiocchi, Segrate (IT); Guido Riva, Milan (IT); Giancarlo Cucco, Villa Cortese (IT)

(73) Assignee: PIRELLI PNEUMATICI S.P.A., Milan (IT)

( * ) Notice: Subject to any disclaimer, the term of this patent is extended or adjusted under 35 U.S.C. 154(b) by 1878 days.

(21) Appl. No.: 10/559,182

(22) PCT Filed: Jun. 19, 2003

(86) PCT No.: PCT/EP03/06495
§ 371 (c)(1),
(2), (4) Date: Jun. 5, 2006

(87) PCT Pub. No.: WO2005/002884
PCT Pub. Date: Jan. 13, 2005

(65) Prior Publication Data
US 2006/0237113 A1    Oct. 26, 2006

(51) Int. Cl.
*B60C 9/22* (2006.01)
*B60C 9/20* (2006.01)
*B60C 9/00* (2006.01)

(52) U.S. Cl.
CPC ........... *B60C 9/2204* (2013.04); *B60C 9/005* (2013.04); *B60C 9/22* (2013.01);
(Continued)

(58) Field of Classification Search
CPC ........ B60C 9/005; B60C 9/22; B60C 9/2204; B60C 9/2009; B60C 2009/2214; B60C 2009/2295; B60C 2009/2252; B60C 2009/2029; Y10T 152/10783
USPC .................. 152/527, 531, 533, 536
See application file for complete search history.

(56) References Cited

U.S. PATENT DOCUMENTS 4,073,330 A * 2/1978 Allard .................. 152/531 X
4,146,415 A * 3/1979 Caretta et al. ........... 152/531 X
(Continued)

FOREIGN PATENT DOCUMENTS

EP    0 335 588 B1    10/1989
EP    0 571 204 B1    11/1993
(Continued)

OTHER PUBLICATIONS

Japan Patent Office, "Notice of Reasons for Rejection," Feb. 13, 2009, 5 pages.

*Primary Examiner* — Adrienne C Johnstone
(74) *Attorney, Agent, or Firm* — Finnegan, Henderson, Farabow, Garrett & Dunner, L.L.P.

(57) ABSTRACT

A tire includes a carcass, a belt structure, and a tread band. The belt structure includes at least two belt plies and at least one belt layer radially external to the belt plies. The at least one belt layer extends at least for an axial width of the at least two belt plies and includes at least one first elongated element and at least one second elongated element. The elongated elements form turns substantially oriented in a circumferential direction of the tire. The turns are alternately disposed along an axial development of the at least one belt layer. The at least one first elongated element is a hybrid cord including at least one high-elastic-modulus filament and at least one low-elastic-modulus filament that are twisted together. An elastic modulus of the at least one second elongated element is lower than an elastic modulus of the at least one first elongated element.

34 Claims, 4 Drawing Sheets

(52) U.S. Cl.
CPC .............. *B60C 2009/2029* (2013.04); *B60C 2009/2214* (2013.04); *B60C 2009/2252* (2013.04); *B60C 2009/2295* (2013.04); *Y10T 152/10783* (2015.01)

(56) References Cited

U.S. PATENT DOCUMENTS

| | | | |
|---|---|---|---|
| 4,155,394 A | | 5/1979 | Shepherd et al. |
| 4,869,307 A | * | 9/1989 | Bormann et al. ............. 152/533 |
| 5,032,198 A | * | 7/1991 | Kojima et al. ............ 152/531 X |
| 5,351,735 A | * | 10/1994 | Okuda ........................ 152/536 |
| 5,404,924 A | * | 4/1995 | Yuze ...................... 152/536 X |
| 5,551,498 A | * | 9/1996 | Komatsuki ................... 152/527 |
| 5,902,425 A | * | 5/1999 | Armellin ................. 152/527 X |
| 5,922,154 A | * | 7/1999 | Lowenhaupt et al. ........ 152/531 |
| 5,935,354 A | | 8/1999 | Billieres |
| 6,058,996 A | * | 5/2000 | Suzuki ........................ 152/527 |

FOREIGN PATENT DOCUMENTS

| | | |
|---|---|---|
| EP | 0571204 A1 | 11/1993 |
| EP | 0 698 510 B1 | 2/1996 |
| EP | 0 790 143 B1 | 8/1997 |
| EP | 0 928 680 A1 | 7/1999 |
| EP | 0 928 702 A1 | 7/1999 |
| EP | 1 106 390 A1 | 6/2001 |
| JP | 61-147280 U | 9/1986 |
| JP | 01-204802 A | 8/1989 |
| JP | 01-247204 A | 10/1989 |
| JP | 04-154404 A | 5/1992 |
| JP | 05-104906 A | 4/1993 |
| JP | 06-305304 A | 11/1994 |
| JP | 07-215011 | 8/1995 |
| JP | 09-277803 A | 10/1997 |
| JP | 2002-059707 A | 2/2002 |
| JP | 2003-516263 T | 5/2003 |

\* cited by examiner

TYRE WITH SPECIFIED BELT STRUCTURE

CROSS-REFERENCE TO RELATED APPLICATIONS

This application is a national-phase entry under 35 U.S.C. §371 from International Application No. PCT/EP2003/006495, filed Jun. 19, 2003, in the European Patent Office, the content of which is relied upon and incorporated herein by reference.

BACKGROUND OF THE INVENTION

1. Field of the Invention

The present invention relates to a tyre for motor vehicles.

In particular, the present invention relates to high performance tyres such as, for example, tyres designed for high-powered cars or, more generally, tyres intended for applications involving high operating speeds.

In more details, the present invention relates to "HP" (High Performance) or "UHP" (Ultra High Performance) tyres.

2. Description of the Related Art

High speed running, e.g. higher than 200 km/h, generates remarkable centrifugal forces at the tread of the tyre due to the rotation thereof.

Said centrifugal forces cause the tyre tread to swell outwardly resulting in the lifting of the tyre tread in the radial direction. This is known as "lifting phenomenon".

This phenomenon should be suitably controlled and limited as much as possible since it negatively affects the tyre behaviour.

For instance, since vehicle electronic systems (e.g. Anti-lock Braking System (ABS), Electronic Stability Program (ESP), traction distribution on the four driving wheels) are traditionally correlated to the variation of the wheel rolling height and are set to a predetermined range thereof, in the case the lifting phenomenon gives rise to an important swelling of the tyre—so that the wheel rolling height falls away from said range—a correct functioning of the abovementioned vehicle electronic systems is no more guaranteed.

Furthermore, in the case the lifting phenomenon is not suitably controlled and limited, an important and different variation of the wheel rolling height can occur in the tyres of the same vehicle so that the latter is equipped with tyres having even very different behaviours from each other.

Moreover, in the case the tyre deformation due to the lifting phenomenon is considerably high, a plurality of further drawbacks can occur.

For instance, the lifting in the radial direction of the crossed belt plies, especially in correspondence of the axial edges thereof, can arise thereby causing the detachment of the belt plies from the carcass; an uneven weariness of the tread band and thus a remarkable decrease of the durability thereof at high speeds can occur; undesired vibrations of the tyre resulting in negatively affecting the ride comfort and remarkably increasing the noisiness of the tyre at high speeds can be promoted.

In order to at least partially solve the abovementioned problems caused by the lifting phenomenon, a belt layer is generally positioned radially external to the crossed belt plies in order to constrain the latter so as to limit the lifting thereof. Generally, said belt layer is provided with low elastic modulus organic fibre cords, e.g. nylon cords, or high elastic modulus organic fibre cords, e.g. aromatic polyamide cords, which are disposed in a substantially circumferential direction with respect to the equatorial plane of the tyre.

Document EP-335,588 discloses a tyre, particularly suitable for high speed passenger cars, comprising a band disposed radially outside the tyre belt, said band comprising a ply composed of at least one cord wound spirally and continuously in the circumferential direction of the tyre at 0 to 3 degrees to the equator of the tyre. The cord of said ply is a hybrid cord comprising a high elastic modulus filament and a low elastic modulus filament twisted together, the hybrid cord having a low elastic modulus in a low elastic modulus zone between zero elongation and a predetermined specific elongation in the range of 2-7% and a high elastic modulus in a high elastic modulus zone above said predetermined specific elongation of the cord. The low and the high elastic moduli change at a transitional point derived from the load elongation curve of the hybrid cord, being the intersecting point of a line orthogonal to the elongation axis passing through the intersection of the tangent to the elongation curve at zero elongation and the tangent to the elongation curve at the break point.

EP-790,143 discloses an improved tyre belt structure capable of improving high speed durability and cornering performance, said belt structure comprising at least two crossed plies of high elastic modulus and a band disposed radially outside said crossed plies, said band comprising a full-width band, which is made of low tensile elastic modulus organic fibre cords arranged substantially parallel to the tyre equator, and a pair of axially spaced edge bands, which are made of high modulus organic fibre cords arranged substantially parallel to the tyre equator. The width of each of the edge bands is between 13% and 26% of the width of the ground contacting area of the tread portion. According to said document the edge bands are provided in order to prevent the lifting of the belt structure and the occurring of the belt edge separation failure when the tyre is subjected to a remarkable centrifugal force during high speed running thereof.

EP-571,204 discloses a pneumatic vehicle tyre comprising a breaker and a bandage of reinforcement plies which extend substantially in the circumferential direction of the tyre. The bandage reinforcement plies consist of overlapping strips in the tyre shoulder regions and are made of only a hybrid material consisting of polyaramid and polyamide. A further middle bandage reinforcement ply of conventional type is provided between two bandage reinforcement plies and is made of polyamide. According to said document the belt structure disclosed therein improves the pneumatic tyre with respect of its high speed running performance, its flat-spot behaviour and its wear behaviour.

SUMMARY OF THE INVENTION

Due to recent increase interest of the market in high speed vehicles, the Applicant has perceived the necessity of providing the pneumatic tyre with a belt structure which is able to limit the lifting phenomenon without impairing the tyre performances, such as, for instance, steering stability, handling, ride comfort, durability.

The Applicant has noticed that, if the tyre is provided with a stiff belt layer in a position radially external to the conventional crossed belt plies, said belt layer succeeds in preventing the lifting phenomenon, but negatively impacts on the tyre performances as well as on the tyre manufacturing process.

In particular, in case the tyre is provided with a very stiff belt layer, said belt layer negatively influences the tyre performances such as: a) the handling, in the sense that even if the car becomes more reactive to the commands given by the driver through the steering wheel, the increased rigidity affects the car suspension system causing a perceivable and tedious roll of the car compartment; b) the ride comfort, especially in the case a bump present on the road has to be overcome (the so-called "plastic comfort"); c) the "acoustic comfort", which represents the level of the noise perceived by the driver inside the passenger compartment due to the tyre structure.

In order to solve the above technical problem, the Applicant has found that the tyre belt structure can be advantageously provided with a belt layer radially external to the crossed belt plies and wound in a substantial circumferential direction of the tyre, said belt layer comprising a first elongated element and a second elongated element so that turns of the first elongated element are alternately disposed in said belt layer with respect to turns of the second elongated element, said first elongated element being a hybrid cord comprising at least a high elastic modulus filament and a low elastic modulus filament twisted together, and said second elongated element having an elastic modulus lower than the elastic modulus of the first elongated element.

The belt layer according to the invention guarantees that, during high speed running of the tyre, a satisfactory balance of a substantially reduced lifting phenomenon and a good overall performance of the tyre is guaranteed.

According to the present invention, turns of said first and second elongated elements are alternately disposed along at least the overall axial width of the crossed belt plies.

Furthermore, according to the present invention, turns of said first and second elongated elements are alternately disposed according to a predetermined alternated sequence.

Furthermore, according to the present invention, said elongated elements are helically wound in a substantially circumferential direction of the tyre so as to provide the tyre belt structure with a belt layer which is positioned radially external to the conventional crossed belt plies.

In the present description, the term "filament" is used to indicate both a monofilament or a yarn (the latter being made of a plurality of flosses, i.e. natural, or artificial, or synthetic textile fibres, which can also be twisted together to form a twisted yarn).

The Applicant has found that the rigidity of the belt layer of the present invention can be modified along the axial width thereof by varying the ratio of the first elongated element density to the second elongated element density along the axial width of the belt layer.

For instance, the Applicant has found that it is advantageous to increase the density of the first elongated element, i.e. of the hybrid cord, in correspondence of the tyre shoulders with respect to the tyre central tread portion so that the rigidity of the belt layer in the tyre shoulders is increased. According to this configuration, since at high speed running the growth of the tyre central tread portion is greater than the growth of the tyre shoulders, the tyre behaviour is favourably improved with respect to the aquaplaning phenomenon since the footprint area increases in correspondence of the central tread portion.

Alternatively, the Applicant has found that, according to a further embodiment of the present invention, the ratio of the first elongated element density to the second elongated element density can be maintained substantially constant all over the axial width of the belt layer so that a uniform and homogeneous distribution of the turns of the first and second elongated elements in the belt ply can be obtained.

In the belt layer of the present invention a preferred alternate sequence of the turns of the first and second elongated elements is that one turn of the first elongated element is alternated to one turn of the second elongated element (i.e. the alternate sequence is 1:1).

In the belt layer of the present invention a further preferred alternate sequence of the turns of the first and second elongated elements is that two turns of the first elongated elements are alternated to one turn of the second elongated element (i.e. the alternate sequence is 2:1).

In the belt layer of the present invention a further preferred alternate sequence of the turns of the first and second elongated elements is that three turns of the first elongated elements are alternated to one turn of the second elongated element (i.e. the alternate sequence is 3:1).

In the belt layer of the present invention a further preferred alternate sequence of the turns of the first and second elongated elements is that four turns of the first elongated elements are alternated to one turn of the second elongated element (i.e. the alternate sequence is 4:1).

The belt layer of the present invention can be obtained by helically winding at least one first elongated element and at least one second elongated element together or separately around the underlying crossed belt plies.

Alternatively, the belt layer of the present invention can be obtained by helically winding a strip-like band comprising at least one first elongated element and at least one second elongated element.

Preferably, the strip-like band comprises a predetermined alternate sequence of said first and second elongated elements embedded in a vulcanizable elastomeric material.

According to a further embodiment of the invention, the belt layer of the present invention comprises more than one layer, each belt layer including a predetermined alternate sequence of said first and second elongated elements.

Preferably, a first radially internal belt layer is disposed along the whole axial width of the crossed belt plies, while any belt layer additional to said first one is not continuous in the axial direction thereby presenting interruptions along the axial width of said belt layer.

For example, an additional belt layer can comprise two portions, each portion being located in correspondence of the axial ends of said first radially internal belt layer. Preferably, said portions are positioned radially external to said first belt layer. Alternatively, said portions are positioned radially internal to said first belt layer.

According to a further embodiment of the invention, the strip-like band of the belt layer is wound interruptedly, for example in correspondence of the tyre equatorial plane so that said belt layer is divided into two portions, each portion being on either sides of the tyre equatorial plane.

Alternatively, said belt layer can be divided into a plurality of portions by introducing a plurality of interruptions at several points of the axial width of the tyre.

BRIEF DESCRIPTION OF THE DRAWINGS

Further characteristics and advantages of the present invention will be illustrated by the following description of some preferred embodiments.

The following description makes reference to the accompanying drawings, in which.

DETAILED DESCRIPTION OF THE EXEMPLARY EMBODIMENTS

For simplicity of description, in the appended drawings, same reference signs correspond to similar or identical components.

Figure 1:
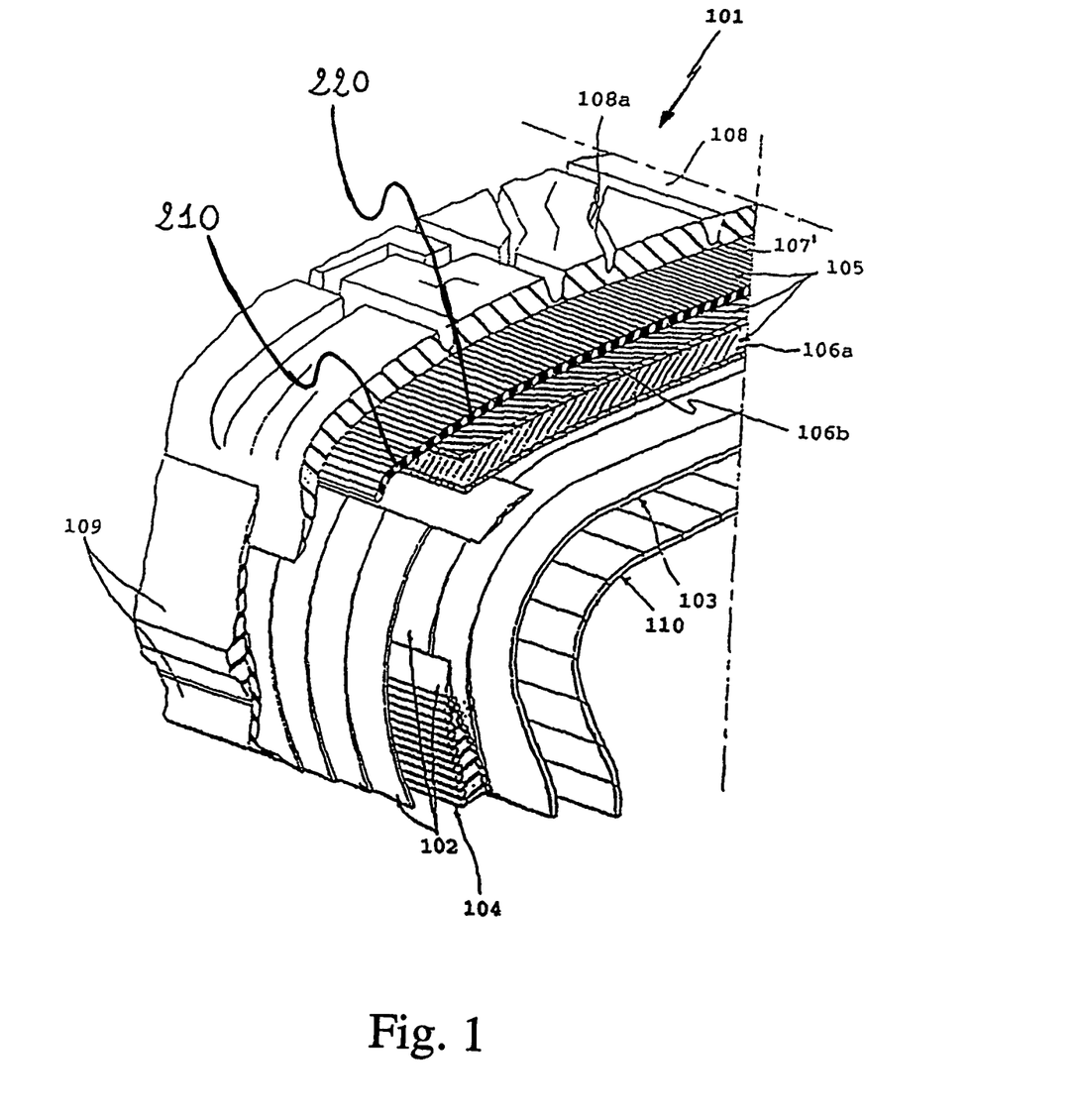
FIG. 1 is a partial cross section of an embodiment of the present invention.

With reference to FIG. 1, a tyre 101 essentially comprises a carcass structure 102 having at least a first carcass ply 103 shaped in a substantially toroidal configuration and engaged, by means of its opposite circumferential edges, to a pair of inextensible annular structures 104 commonly known as "bead cores" which, once the tyre is finished, are located in the zone usually referred to as the tyre bead. The opposite lateral edges of the abovementioned carcass ply 103 are coupled with respective bead cores 104 (see, for example, European patent applications EP-A-0,928,680 and EP-A-0,928,702). In this case, the carcass ply is not folded around the annular inserts (i.e. the bead cores), the coupling being provided by a second carcass ply which is applied on the outside of the first carcass ply.

Alternatively, the coupling between the carcass ply 103 and the bead cores 104 may be achieved by folding back the opposite lateral edges of the carcass ply 103 around the bead cores 104, so as to form the abovementioned carcass backfolds (not shown in FIG. 1).

The carcass ply 103 generally consists of a plurality of reinforcing cords arranged parallel to each other and at least partially coated with a layer of elastomeric material. These reinforcing cords are usually made of textile fibres, for example rayon, nylon or polyethylene terephthalate, or of steel wires which are stranded together and preferably coated with a metal alloy (for example copper/zinc, zinc/manganese or zinc/molybdenum/cobalt alloys, and the like).

The carcass ply 103 is usually of radial type, i.e. it incorporates reinforcing cords arranged in a substantially perpendicular direction relative to a circumferential direction.

A belt structure 105 comprising one or more belt plies 106a, 106b, 107' is applied to the carcass structure 102, in a circumferentially external position. In the specific embodiment of FIG. 1, the belt structure 105 comprises two belt plies 106a, 106b which incorporate a plurality of reinforcing cords, typically metal reinforcing cords, which are parallel to each other in each ply and intersecting with respect to the adjacent ply, being oriented so as to form a predetermined angle with respect to a circumferential direction.

The belt structure 105 further comprises at least one belt layer 107', commonly known as a "zero degree belt layer", which is placed radially external to the crossed belt plies 106a, 106b.

A tread band 108 is circumferentially superimposed on the belt structure 105 and, due to the moulding step carried out concomitantly with the curing step of the tyre, said tread band is traditionally provided with longitudinal and/or transverse grooves 108a arranged so as to define a desired "tread pattern".

The tyre 101 also comprises a pair of sidewalls 109 applied laterally to the opposite sides of the carcass structure 102. A strip made of elastomeric material (not shown in FIG. 1) commonly known as a "mini-sidewall" may optionally be present in the connecting zone between the sidewalls 109 and the tread band 108, which is generally obtained by co-extrusion with the tread band and makes it possible to improve the mechanical interaction between the tread band 108 and the sidewalls 109.

In the case tubeless tyres are concerned, a liner 110 is provided consisting of a layer of elastomeric material which is impermeable to air, said layer being located on the inner surface of the tyre, i.e. in a radially internal position with respect to the carcass ply 103.

Modern processes for the production of a tyre or parts thereof without using semi-finished products are described, for example, in the above mentioned patent applications EP-A-0,928,680 and EP-A-0,928,702.

According to the present invention, the belt layer 107' comprises a first elongated element 210 and a second elongated element 220 helically wound in a substantially circumferential direction. In particular, according to the embodiment of FIG. 1, the belt layer 107' comprises one turn of a first elongated element 210 alternate, along the axial width of the crossed belt plies, with one turn of a second elongated element 220.

Preferably, said elongated elements are arranged from 0° to 5° with respect to the equatorial plane of the tyre.

According to the embodiment shown in FIG. 1 the alternated sequence of the turns of said first 210 and second 220 elongated elements is constant along the axial development of the belt layer 107' and is equal to 1:1.

Figure 2:
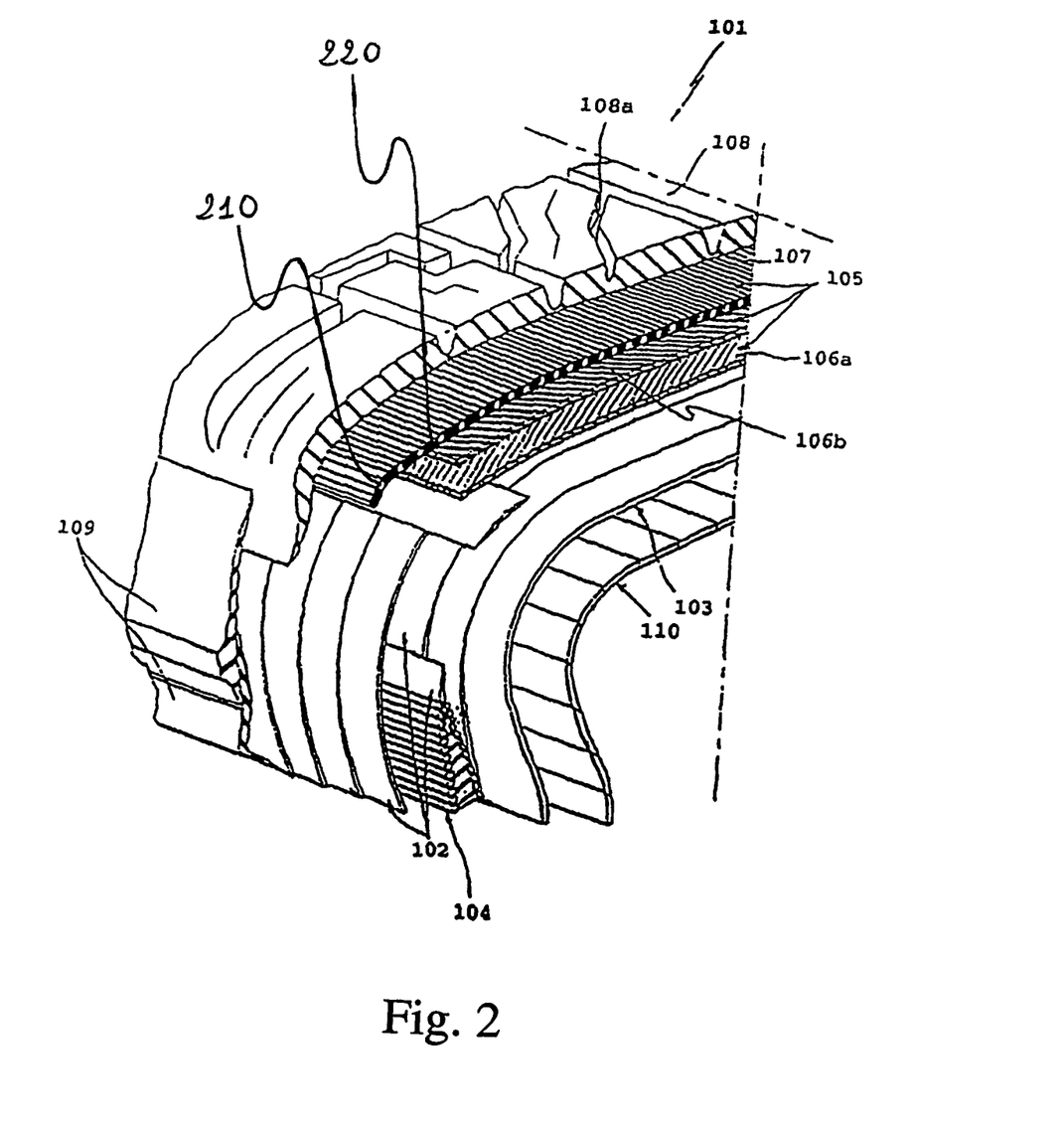
FIG. 2 is a partial cross section of a further embodiment of the present invention.

FIG. 2 shows a further embodiment of the present invention according to which the rigidity of the belt layer 107 of the present invention changes along the axial width thereof by varying the alternate sequence of the turns of said first 210 and second 220 elongated elements.

In more details, in the belt layer 107' of FIG. 2 the ratio of the first elongated element density to the second elongated element density along the axial width of the belt layer is not constant. In fact, the embodiment of FIG. 2 shows that in the axial end portions of the belt layer 107 the density of the first elongated element 210 (i.e. the hybrid cord) is higher than in the central portion of the layer, i.e. in the portion which is astride of the equatorial plane of the tyre. In particular, according to the embodiment of FIG. 2 the alternated sequence of the turns of the first and second elongated elements in the belt layer 107 is 2:1 in the axial end portions of said layer and is 1:1 in the central portion.

According to the present invention, the first elongated element 210 is a hybrid cord comprising at least a high elastic modulus filament and a low elastic modulus filament which are twisted together.

Preferably, the high elastic modulus filament of the hybrid cord has a load at an extension of 1% (LASE 1%) greater than or equal to 3 cN/dTex, preferably from 4 cN/dTex to 7 cN/dTex.

Preferably, the high elastic modulus filament of the hybrid cord is selected from: aromatic polyamide fiber, high modulus polyester fibers (e.g. polyethylene naphthalate—PEN), polyvinyl alcohol fiber, carbon fiber.

Preferably, the low elastic modulus filament of the hybrid cord has a load at an extension of 5% (LASE 5%) lower than or equal to 5 cN/dTex, preferably from 1 cN/dTex to 4 cN/dTex.

Preferably, the low elastic modulus filament of the hybrid cord is selected from: nylon fiber, low modulus polyester fibers (e.g. polyethylene terephthalate—PET), vinylon fiber.

Preferably, the hybrid cord has a load at an extension of 5% (LASE 5%) greater than 70 N, preferably greater than 75, even more preferably from 80 N to 150 N.

According to a preferred embodiment of the present invention, the hybrid cord is formed by aramidic fiber and rayon fiber.

Preferably, the hybrid cord is formed of two distinct filaments, i.e. a high elastic modulus filament is twisted together with a low elastic modulus filament.

Alternatively, the hybrid cord is formed of three filaments, i.e. two high elastic modulus filaments twisted together with one low elastic modulus filament or one high elastic modulus filament twisted together with two low elastic modulus filaments.

Preferably, the filaments of the hybrid cord have a count from 400 dTex (this measure unit is the weight in grams corresponding to 10,000 m of fiber) to 3,000 dTex, preferably from 800 dTex to 2,200 dTex.

Preferably, the hybrid cord twist is from 100 tpm (turn per meter) to 600 tpm, preferably from 200 tpm to 400 tpm.

As mentioned above, according to the present invention the belt layer further comprises a second elongated element.

Preferably, the second elongated element is a cord. Preferably, said cord consists of two or three filaments. For instance, suitable combinations for the obtainment of said cords are: two yarns twisted together, one or more yarns twisted with one or more steel or textile monofilaments.

Alternatively, said second elongated element is a steel or textile monofilament. Alternatively, said second elongated element is a yarn.

Preferably, the second elongated element has a load at an extension of 5% (LASE 5%) lower than 70 N, preferably from 25 N to 50 N.

Preferably, the second elongated element is selected from: nylon fiber, polyester fiber, vinylon fiber, polyethylene terephthalate, a preformed steel cord.

A preformed steel cord is a steel cord which is plastically deformed, according to any method known in the art, in such a way that the longitudinal extension of said cord has an undulating form. For the purposes of the present description, the term "undulating form" is understood as indicating any form which is not straight. In this respect, undulating forms are regarded as including, for example, sinusoidal, helical and zigzag forms. Particularly preferred is a preforming according to substantially sinusoidal undulations. Preferably, said sinusoidal undulations have a wavelength of between 2.5 mm and 30 mm, and more preferably between 5 mm and 25 mm. Preferably, said sinusoidal undulations have a wave amplitude of between 0.12 mm and 1 mm.

Preferably, the filament(s) of the second elongated element has (have) a count from 400 dTex to 3,000 dTex, preferably from 800 dTex to 2,200 dTex.

In case the second elongated element is a preformed steel cord, preferably the diameter of the filament(s) is (are) from 0.1 mm to 0.4 mm, preferably from 0.12 mm to 0.35 mm.

In the case the second elongated element is a cord (i.e. presents more than one filament), the filaments of this cord have all the same diameter. Alternatively, said filaments have diameters different from each other.

According to the present invention, the ratio between the density of the first elongated element and the density of the second elongated element in the belt layer ranges (in percentage) from 10/90 to 90/10, preferably from 50/50 to 80/20.

Preferably, the alternated sequence of the turns respectively of the first and second elongated elements in the belt layer is: 1:1; 2:1; 2:2; 3:1; 4:1.

Figure 3:
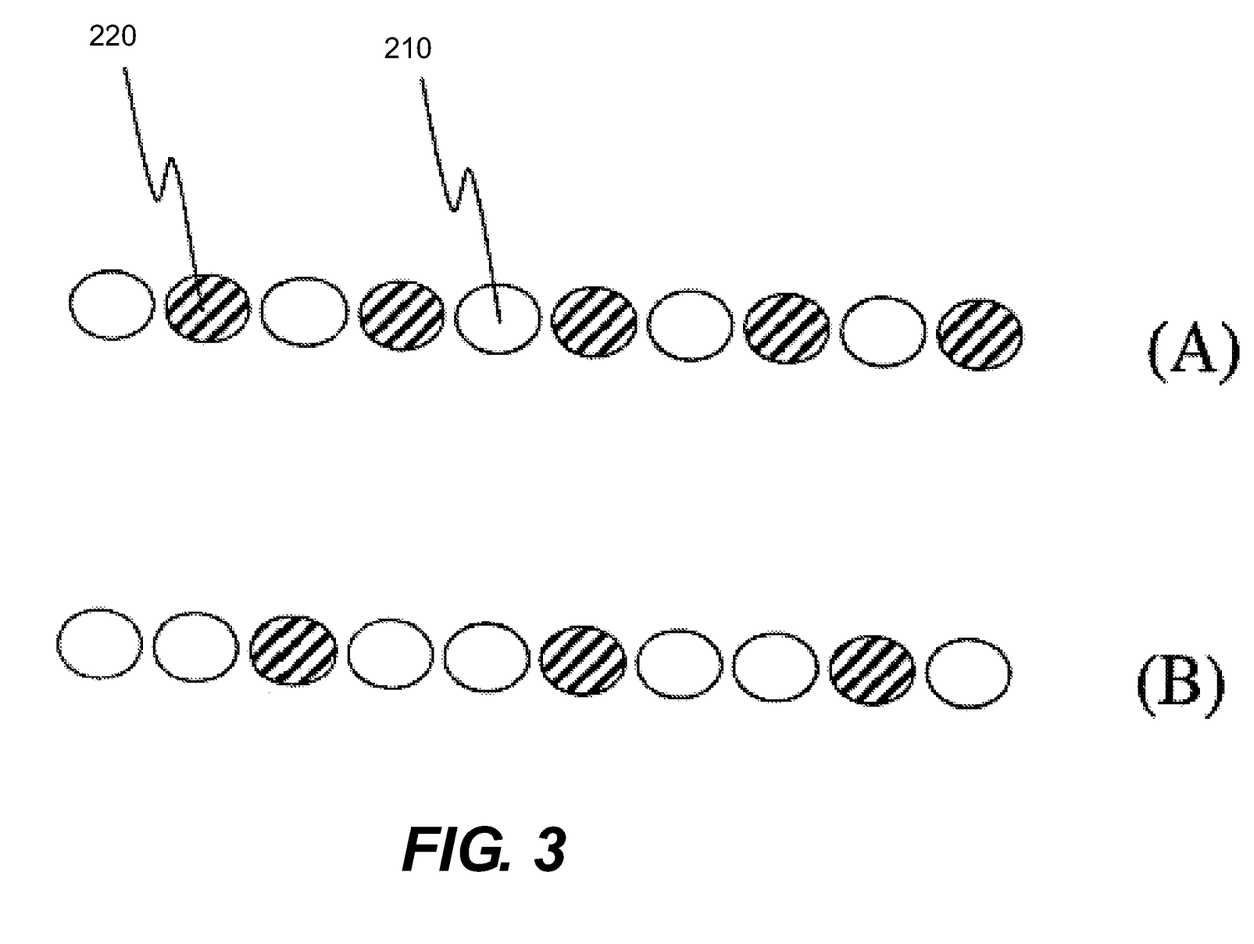
FIG. 3 is a schematic representation of two different sequences of a belt layer of the present invention and FIG. 4 is the load/deformation curve concerning four different strip-like bands suitable for being used in a tyre 0° belt layer.

FIG. 3 shows two examples A, B of sequences of turns of said first 210 and second 220 elongated elements in the belt layer of the present invention.

In more details, the sequence A corresponds to a uniform and constant alternation in the belt layer of one turn of a first elongated element 210 and one turn of a second elongated element 220, while the sequence B corresponds to a uniform and constant alternation in the belt layer of two turns of a first elongated element 210 and one turn of a second elongated element 220.

Preferably, the belt layer of the present invention is employed in pneumatic tyres which are suitable for running at high speeds.

In more details, the belt layer of the present invention is particularly suitable for "HP" (High Performance) or "UHP" (Ultra High Performance) tyres, i.e. for tyres belonging to Classes "H" and "V" (maximum speed over 210 Km/h) and to Classes "W" and "Y" (maximum speed over 240 Km/h). Furthermore, the present invention is suitable for tyres whose maximum speed is over 300 km/h.

Preferably, the tyre of the invention has a H/C ratio, of the height of the right cross-section to the maximum width of the section, ranging between 0.65 and 2.0. Preferably, the tyre of the present invention is a tyre having very low cross-section, e.g. with a ratio H/C of between 0.25 and 0.65, preferably from 0.25 and 0.45.

For further description of the invention, some illustrative examples are given below.

Example 1

Five distinct strip-like bands were produced by using the following cords:

cord A: AR/NY 1670/1400 (260/70)×260
cord B: NY 1400/2 270×270
cord C NY 1400/1 150Z wherein cord A—which is the first elongated element according to the present invention—is a hybrid cord consisting of one aramidic fiber filament (AR) and one filament of Nylon (NY); 1670 is the count (in dTex) of the aramidic fiber filament and 1400 is the count (in dTex) of the filament of Nylon; 260 (in tpm) indicates the twist of the aramidic fiber filament, while 70 (in tpm) indicates the twist of the Nylon filament; ×260 (in tpm) indicates the cord twist.;

wherein cord B—which is the second elongated element according to the present invention—is a cord consisting of two filaments of Nylon; 1400 is the count (in dTex) of the two filaments of Nylon; 270 (in tpm) indicates the twist of each filament of Nylon; ×270 (in tpm) indicates the cord twist, and wherein cord C—which is the second elongated element according to the present invention—is a cord consisting of one filament of Nylon; 1400 is the count (in dTex) of the filament; 150 (in tpm) indicates the twist of the filament; Z indicates the sense of the twisting of the filament.

In more details, the following five strip-like bands (having length of 1,000 mm and width of 12.7 mm) were obtained:

1) a strip-like band (comparative band 1) in which the 100% of the cords embedded in the elastomeric material were the cords A; the density of the cords was 80 cords/dm; the thickness of the band was 1.2 mm; the band contained 10 cords parallel to each other and to the longitudinal axis of the band;
2) a strip-like band (invention band 1) in which the 50% of the cords embedded in the elastomeric material were the cords A and the 50% were the cords B; the density of the cords was 80 cords/dm; the thickness of the band was 1.2 mm; the band contained 10 cords parallel to each other and to the longitudinal axis of the band;
3) a strip-like band (invention band 2) in which the 80% of the cords embedded in the elastomeric material were the cords A and the 20% were the cords B; the density of the cords was 80 cords/dm; the thickness of the band was 1.2 mm; the band contained 10 cords parallel to each other and to the longitudinal axis of the band;
4) a strip-like band (comparative band 2) in which the 100% of the cords embedded in the elastomeric material were the cords B; the density of the cords was 80 cords/ dm; the thickness of the band was 0.85 mm; the band contained 10 cords parallel to each other and to the longitudinal axis of the band;

5) a strip-like band (comparative band 3) in which the 100% of the cords embedded in the elastomeric material were the cords C; the density of the cords was 110 cords/dm; the thickness of the band was 0.80 mm; the band contained 14 cords parallel to each other and to the longitudinal axis of the band.

Figure 4:
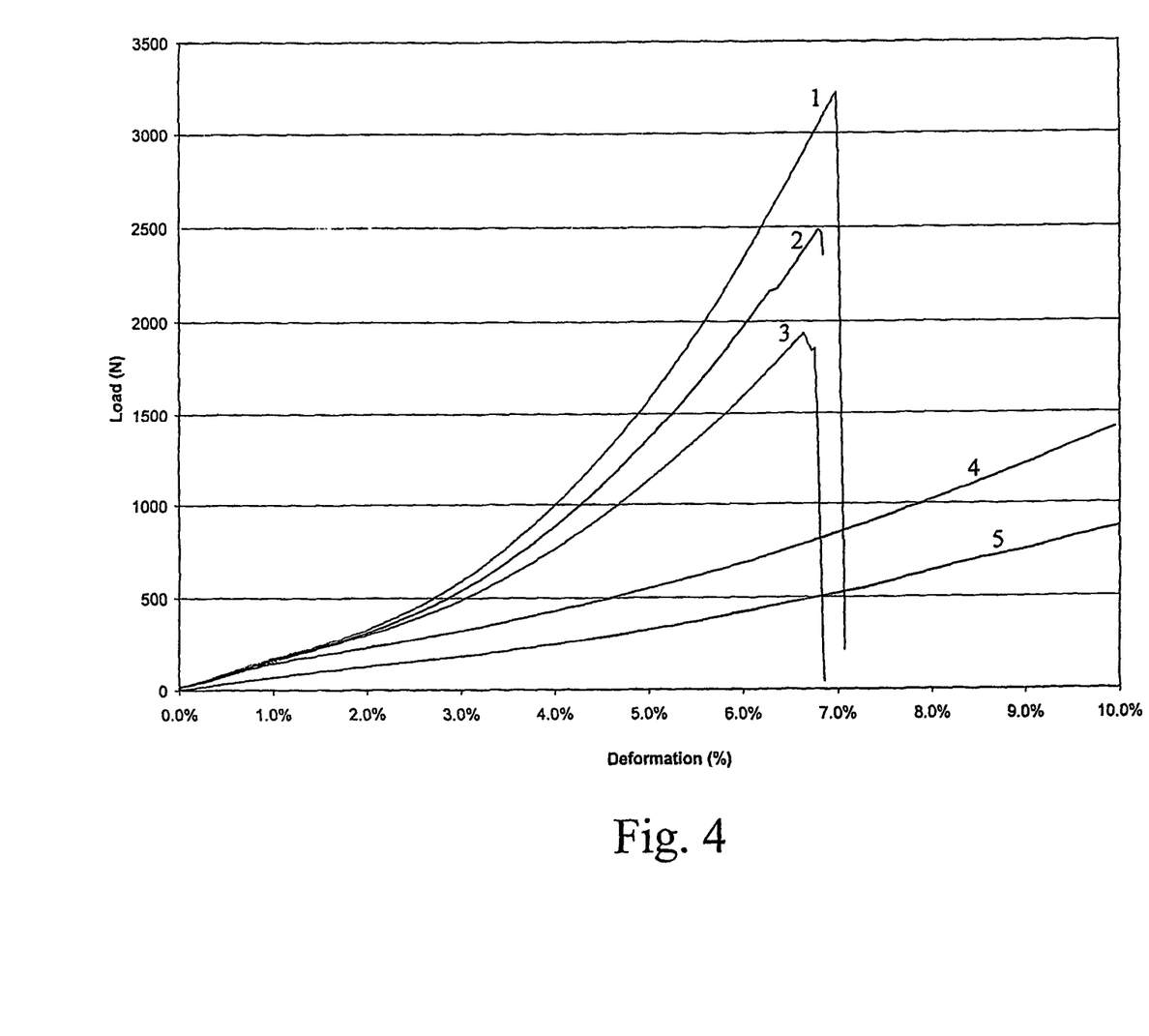

The curve of FIG. 4—wherein in abscissa is indicated the deformation (in percentage) which is given to a strip-like band and in ordinates is indicated the load (in N) which is obtained from said deformation—shows the curves 1 to 5 corresponding respectively to the strip-like bands 1) to 5) mentioned above.

In more details, the curve 5 of the curve represents the elongation curve of the strip-like band 5) which comprises only the low elastic modulus cords C, i.e. the cords formed of one Nylon filament while the curve 4 represents the elongation curve of the strip-like band 4) which comprises only the low elastic modulus cords B, i.e. the cords formed of two Nylon filaments. The curve 1 of the curve represents the elongation curve of the strip-like band 1) which comprises only the hybrid cords A, said curve 1 showing that the elastic modulus of the strip-like band 1) is higher than that of the strip-like band 4).

The curves 2 and 3—referring to the strip-like bands of the invention—lie between the curves 1 and 5, i.e. the strip-like bands of the present invention have an elastic modulus which is intermediate between that of the strip-like band comprising only hybrid cords and that of the strip-like band comprising only Nylon cords.

Therefore, as explained above, the curve of FIG. 4 shows that it is possible to modify the stiffness of the strip-like band by modifying the ratio of the hybrid cords and the Nylon cords present in the same band.

Example 2

Five tyres 1 to 5, having size 235/35 R19, were manufactured by using respectively the strip-like bands 1) to 5) of Example 1.

The tyres 1 to 5 had identical structural elements (e.g. identical carcass, crossed belt plies, bead cores, tread band) but for the 0° belt layer positioned radially external to the crossed belt plies, said 0° belt layer having been produced by using the different strip-like bands of Example 1.

Furthermore, the 0° belt layers of the tyres 2 to 5 consisted of two layers obtained by spirally winding twice the strip-like bands 2) to 5) respectively, while the 0° belt layer of the tyre 1 consisted of only one layer obtained by spirally winding twice the strip-like band 1).

Indoor and outdoor testings were carried out on the tyres 1 to 5.

Indoor Testings
a) Tyre diameter variation

The tyre was rotated against a road wheel at increasing speeds. In more details, the road wheel was rotated from 20 km/h to 260 km/h; the speed was incremented of 20 km/h every two minutes. The tyre rolling radius (height) was measured by calculating the difference between the tip speeds of the road wheel and the tyre respectively, and the tyre diameter variation was calculated (as the difference in percentage between the tyre diameter values at the two distinct speeds mentioned above) in order to measure the growth of the tyre while increasing the speed. Said test was used in order to evaluate the lifting phenomenon.

b) High speed durability

The tyre was rotated against a road wheel at increasing speeds. In more details, the road wheel was rotated at 240 km/h for 1 minute and successively the speed was incremented of 10 km/h every ten minutes. The test was stopped when the failure of the tyre occured, said failure being due, for instance, to breakage of the cords, chunkings, tearing of a block, carcass plies detachment, belt plies detachment, blister formation.

The results were expressed by means of an index: the reference index was 100 and said value was incremented of one single point every time period (e.g. 1 minute) which passed without the occurrence of the tyre failure. Furthermore, said value was incremented of three points at each speed increasing.

The results are summarized in Table 1.

TABLE 1

| | Tyre diameter variation (%) | High speed durability |
|---|---|---|
| Tyre 1 (comparative) | 1.2 | 115 |
| Tyre 2 (invention) | 1.4 | 107 |
| Tyre 3 (invention) | 1.2 | 104 |
| Tyre 4 (comparative) | 1.6 | 100 |
| Tyre 5 (comparative) | 2.2 | 100 |

From the results summarized in Table 1 it can be pointed out that:

the tyres of the invention exhibit a limited tyre growth while running at high speed; especially tyre 3 (whose 0° belt layer comprises a percentage of hybrid cords which is four times the percentage of the nylon cords) has a diameter variation which is the same of that of tyre 1 (whose 0° belt layer comprises only hybrid cords), while tyre 2 has a diameter variation which is slightly higher than that of tyre 1, but sensibly lower than the diameter variations of tyres 4 and 5 (especially of tyre 5) Therefore, the tyres of the invention provides for a significant improvement in opposing to the lifting phenomenon with respect to comparative tyres 4 and 5 (whose 0° belt layers comprise only Nylon cords). Furthermore, the result of tyre 2 of the invention is comparable with that of tyre 1 which is the most performant. For HP or UHP applications, the diameter variation of comparative tyre 5 is unacceptable;

the tyres of the invention exhibit good high speed durability, especially tyre 2 whose result is comparable with that of tyre 1 which is the most performant. For HP or UHP applications, the high speed durability of comparative tyres 4 and 5 is unacceptable;

the comparative tyre 1 exhibits very good indoor results.

Outdoor Testings
a) Straight running

The test was conducted at different speeds on straight roads having different surfaces (e.g. flat and regular surface and undulated surface). For instance, the driver evaluated in the different test conditions the steering corrections (if any) necessary to keep a straight path, the capacity of the tyre to overcome any upward projecting bumps of the road, the rigidity of the steering-wheel.

b) Handling

The handling tests were conducted on a track and the test driver simulated some characteristic manoeuvring (change of lane, entering a bend, leaving a bend, for example) carried out at constant speed, in acceleration and in deceleration. Then the test driver judged the tyre behaviour and assigned a score depending on the tyre performance during said manoeuvring.

The handling is divided into two voices (soft handling and hard handling) depending on the type of manoeuvre carried out by the test driver. The soft handling relates to the use of the tyre under normal running conditions, i.e. in conditions of normal speed and good transversal grip. On the contrary the hard handling tests describe the behaviour of the tyre at the limit of adherence, i.e. under extreme driving conditions. In the latter case the test driver executes manoeuvres which an average driver might be forced to carry out in the case of unforeseen and hazardous circumstances: sharp steering at high speed, sudden changing of lanes to avoid obstacles, sudden braking and the like.

c) Plastic comfort

The test was carried out along a straight section equipped with microphones. The car entered the section at a pre-defined speed of entry, after which the engine was switched off and the noise outside the car in neutral gear was measured. The comfort was evaluated in terms of the overall sensations perceived by the test driver compared to the capacity for the tyre to absorb the roughness of the road surface. The comfort test was carried out in the conditions prescribed by the standard RE01.

The vehicle used for the tests was a Porsche Carrera 996 fitted with the tyres of the invention. The tyres were fitted on standard rims and were inflated to the nominal operating pressure.

The results of said tests, which are summarized in Table 2, are expressed by means of an evaluation scale representing the subjective opinion expressed by a test driver through a point system. The values reproduced in the following table represent a mean value between those obtained in several test sessions (5-6 tests, for example) and given by several test drivers.

TABLE 2

|  | Straight running | Soft handling | Hard handling | Comfort |
|---|---|---|---|---|
| Tyre 1 (comparative) | 100 | 100 | 100 | 85 |
| Tyre 2 (invention) | 85 | 90 | 85 | 100 |
| Tyre 3 (invention) | 90 | 100 | 90 | 100 |
| Tyre 4 (comparative) | 85 | 90 | 80 | 90 |
| Tyre 5 (comparative) | 85 | 90 | 80 | 85 |

From the results summarized in Table 2 it can be pointed out that:

as far as straight running and hard handling are concerned, the results of the tyres of the invention are comparable with or least slightly better than the results of comparative tyres 4 and 5, while comparative tyre 1 is the most performant;

with reference to the voice "soft handling", tyre 3 (tyre of the invention) is comparable with comparative tyre 1, while tyre 2 (tyre of the invention) is comparable with comparative tyres 4 and 5;

with reference to the voice "comfort", the tyres of the invention are remarkably better than all the comparative tyres 1, 4 and 5.

Therefore, the tyres of the present invention exhibit limited tyre growth, rather good high speed durability and good overall outdoor results, among which a remarkable and very important improvement is obtained with reference to the comfort.

It has to be noted that in the recent years, in HP and UHP applications, the voice "comfort" is playing a very important role which is becoming increasingly relevant.

This is mainly due to the fact that high speed increased a lot in the last years and even more vehicles can reach high and very high speed values.

Therefore, the driver, who likes high speeds, has become more demanding than before and requires that a good comfort level is maintained even when running at high speeds. The belt layer of the present invention succeeds in this aim to be achieved.

The invention claimed is:

1. A tyre, comprising:
    a carcass;
    a tread band radially external to the carcass; and
    a belt structure interposed between the carcass and the tread band;
    wherein the belt structure comprises:
        at least two belt plies; and
        at least one belt layer radially external to the at least two belt plies;
    wherein each belt ply incorporates a plurality of reinforcing cords parallel to each other in the respective ply,
    wherein the reinforcing cords of a first belt ply cross the reinforcing cords of a second belt ply,
    wherein the reinforcing cords of each belt ply are oriented to form a respective predetermined angle with respect to a circumferential direction of the tyre,
    wherein the at least one belt layer extends at least for an axial width of the at least two belt plies,
    wherein the at least one belt layer comprises:
        at least one first elongated element; and
        at least one second elongated element;
    wherein the elongated elements are helically wound to form turns substantially oriented in the circumferential direction of the tyre,
    wherein the turns of the elongated elements are alternately disposed along an axial development of the at least one belt layer,
    wherein the at least one first elongated element is a hybrid cord comprising:
        at least one high-elastic-modulus aramidic fiber filament; and
        at least one low-elastic-modulus nylon fiber filament;
    wherein the at least one high-elastic-modulus filament and the at least one low-elastic-modulus filament are twisted together,
    wherein the at least one second elongated element is a nylon fiber;
    wherein an elastic modulus of the at least one second elongated element is lower than an elastic modulus of the at least one first elongated element;
    wherein a turn of the at least one first elongated element is disposed between two turns of the at least one second elongated element with a space devoid of an elongated element between the turn of the at least one first elongated element and one of the two turns of the at least one second elongated element;

wherein the at least one belt layer is obtained by helically winding a strip band along an axial direction of the tyre;

wherein the strip band comprises a predetermined alternate sequence of the turns of the at least one first elongated element and the at least one second elongated element; and wherein the tyre is a car tyre.

2. The tyre of claim 1, wherein a ratio of a density of the at least one first elongated element to a density of the at least one second elongated element is constant over an axial width of the at least one belt layer.

3. The tyre of claim 1, wherein a ratio of a density of the at least one first elongated element to a density of the at least one second elongated element is greater than or equal to 10:90 and less than or equal to 90:10.

4. The tyre of claim 1, wherein a ratio of a density of the at least one first elongated element to a density of the at least one second elongated element is greater than or equal to 50:50 and less than or equal to 80:20.

5. The tyre of claim 1, wherein the strip band is continuously wound in turns axially arranged side-by-side.

6. The tyre of claim 1, wherein the strip band is continuously wound in turns that radially overlap.

7. The tyre of claim 1, wherein the at least one belt layer is obtained by interruptedly winding the strip band along the axial direction of the tyre.

8. The tyre of claim 7, wherein the winding is interrupted near an equatorial plane of the tyre.

9. The tyre of claim 7, wherein the winding comprises a plurality of interruptions along the axial direction of the tyre.

10. The tyre of claim 1, wherein the turns of the elongated elements are oriented greater than or equal to 0° and less than or equal to 5° with respect to an equatorial plane of the tyre.

11. The tyre of claim 1, wherein the at least one high-elastic-modulus filament of the hybrid cord has a load at a specific extension of 1% (LASE 1%) greater than or equal to 3 cN/dTex.

12. The tyre of claim 1, wherein the at least one high-elastic-modulus filament of the hybrid cord has a load at a specific extension of 1% (LASE 1%) greater than or equal to 4 cN/dTex and less than or equal to 7 cN/dTex.

13. The tyre of claim 1, wherein the at least one low-elastic-modulus filament of the hybrid cord has a load at a specific extension of 5% (LASE 5%) less than or equal to 5 cN/dTex.

14. The tyre of claim 1, wherein the at least one low-elastic-modulus filament of the hybrid cord has a load at a specific extension of 5% (LASE 5%) greater than or equal to 1 cN/dTex and less than or equal to 4 cN/dTex.

15. The tyre of claim 1, wherein the hybrid cord has a load at a specific extension of 5% (LASE 5%) greater than 70 N.

16. The tyre of claim 1, wherein the hybrid cord has a load at a specific extension of 5% (LASE 5%) greater than or equal to 80 N and less than or equal to 150 N.

17. The tyre of claim 1, wherein the hybrid cord is formed of two filaments.

18. The tyre of claim 1, wherein the hybrid cord is formed of three filaments.

19. The tyre of claim 1, wherein the filaments of the hybrid cord have a count greater than or equal to 400 dTex and less than or equal to 3,000 dTex.

20. The tyre of claim 1, wherein the filaments of the hybrid cord have a count greater than or equal to 800 dTex and less than or equal to 2,200 dTex.

21. The tyre of claim 1, wherein the hybrid cord twist is greater than or equal to 100 tpm and less than or equal to 600 tpm.

22. The tyre of claim 1, wherein the hybrid cord twist is greater than or equal to 200 tpm and less than or equal to 400 tpm.

23. The tyre of claim 1, wherein the at least one second elongated element is a cord.

24. The tyre of claim 23, wherein the cord of the at least one second elongated element is formed of two filaments.

25. The tyre of claim 23, wherein the cord of the at least one second elongated element is formed of three filaments.

26. The tyre of claim 1, wherein filaments of the at least one second elongated element have a load at a specific extension of 5% (LASE 5%) less than 70 N.

27. The tyre of claim 1, wherein filaments of the at least one second elongated element have a load at a specific extension of 5% (LASE 5%) greater than or equal to 25 N and less than or equal to 50 N.

28. The tyre of claim 1, wherein filaments of the at least one second elongated element have a count greater than or equal to 400 dTex and less than or equal to 3,000 dTex.

29. The tyre of claim 1, wherein filaments of the at least one second elongated element have a count greater than or equal to 800 dTex and less than or equal to 2,200 dTex.

30. The tyre of claim 1, wherein filaments of the at least one second elongated element have a diameter greater than or equal to 0.1 mm and less than or equal to 0.4 mm.

31. The tyre of claim 1, wherein the tyre;
has speed symbol "H" or "V"; or
is rated in speed category "not exceeding 210 km/hr" or "not exceeding 240 km/hr".

32. The tyre of claim 1, wherein the tyre:
has speed symbol "W" or "Y"; or
is rated in speed category "not exceeding 270 km/hr" or "not exceeding 300 km/hr".

33. The tyre of claim 1, wherein another turn of the at least one first elongated element is disposed between the turn of the at least one first elongated element and one of the two turns of the at least one second elongated element.

34. The tyre of claim 1, wherein another three turns of the at least one first elongated element are disposed between the turn of the at least one first elongated element and one of the two turns of the at least one second elongated element.

* * * * *